April 2, 1940.  L. A. PARADISE ET AL  2,196,025
ENSILAGE HARVESTER
Filed Oct. 3, 1938   5 Sheets-Sheet 4

FIG-4

INVENTORS
LOUIS A. PARADISE
WILBUR J. COULTAS
BY
ATTORNEYS

Patented Apr. 2, 1940

2,196,025

UNITED STATES PATENT OFFICE 2,196,025

ENSILAGE HARVESTER

Louis A. Paradise and Wilbur J. Coultas, Moline, Ill., assignors to Deere & Company, Moline, Ill., a corporation of Illinois Application October 3, 1938, Serial No. 232,985

19 Claims. (Cl. 56—16)

The present invention relates generally to agricultural implements and more particularly to an implement attachment of the type adapted to be mounted on and connected with a tractor, the whole constituting a complete unitary machine.

The principal object of the present invention resides in novel means for mounting an implement attachment on a tractor whereby the implement is adapted to move coadunatively with the tractor and is gauged by the tractor wheels.

Another object is the provision of individually sprung auxiliary supporting wheels for carrying a portion of the weight of the implement attachment, together with improved and simplified means for mounting the wheels on the implement frame.

Another object of the present invention is to provide an implement attachment that can be easily mounted on or dismounted from the supporting tractor in one piece and without necessitating the dismantling of certain large portions thereof. Heretofore it has been necessary with tractor mounted implements of this type to dismantle various sections of the implement piece by piece in order to allow the tractor to be driven into or out of the frame, frequently requiring the labor of several men as well as the use of a hoist or jack, and for all practical purposes tying the tractor up for any other work until the job at hand is completed. With our invention, however, the greater part of this work has been eliminated and it is necessary only to disconnect the few operative connections and tilt the machine back on its auxiliary wheels so that the tractor may be driven clear.

Another object is to provide auxiliary supporting wheels which also act as transport wheels when the implement is dismounted from the tractor, enabling the attachment to be moved around easily by hand and facilitating the work of mounting and dismounting the implement on the tractor.

Still another object of the present invention is to provide an ensilage harvesting attachment adapted to be mounted bodily on a tractor and having gathering arms extending forwardly along one side of the tractor body ahead of the rear axle thereof, with ensilage cutting and elevating mechanism disposed across the back of the tractor body.

A further object of the present invention is the provision of improved means for adjusting the position of the implement relative to the tractor.

These and other objects and advantages of the present invention will become apparent to those skilled in the art after a consideration of the following detailed description of the preferred embodiment thereof, reference being had to the appended drawings, in which.

Referring now to the drawings, the tractor 10 comprises a body 11 having a transversely disposed rear axle housing 12 in which are journaled axles 13 and 14 carrying driving wheels 15 and 16, respectively. The front end of the tractor body is supported on a dirigible truck 20 and the latter is steered through the agency of steering gear 21. The ensilage harvester attachment consists of a frame, indicated generally by the reference numeral 22, rockably supported on the tractor body 11 on two laterally spaced, transversely disposed coaxial shafts 23 and 24 which are carried by two pairs of spaced, forwardly extending frame members 28 and 29, respectively, each of said shafts being journaled in suitable bracket means 25 fixed to the back side of the rear axle housing 12. The frame structure 22 extends forwardly on the left hand side of the tractor between the body 11 and driving wheel 15 and supports a pair of laterally spaced gathering arms 26 and 27 of more or less conventional design, and the rear portion of the frame structure 22 supports the ensilage cutting mechanism which is indicated as an entirety by the reference numeral 30.

The gathering members 26, 27 are each provided with the usual gathering chains 31 which operate to convey the corn stalks rearwardly to the reciprocating knife or cutter 32 which severs the stalks near the ground. The gathering chains 31 then raise the stalks over the rear axle housing 12 and deliver them to a feeder house or hopper 33 from which the stalks are delivered to the ensilage cutting mechanism 30. This hopper 33 and the ensilage cutting mechanism are disposed transversely of the implement and are supported on the rear portion of the frame structure 22. The feed hopper 33 is provided with a receiving opening or throat at its upper end to receive the corn stalks conveyed upwardly thereto by the gathering chains 31, the hopper opening laterally toward the left so that the corn stalks are tilted in that direction behind the left rear wheel 15 of the tractor as they approach the hopper throat. The feed hopper 33 then guides the stalks downwardly toward the right behind the tractor, butt end first, onto the feed conveyor indicated as an entirety by the numeral 34.

Figures 5, 6:
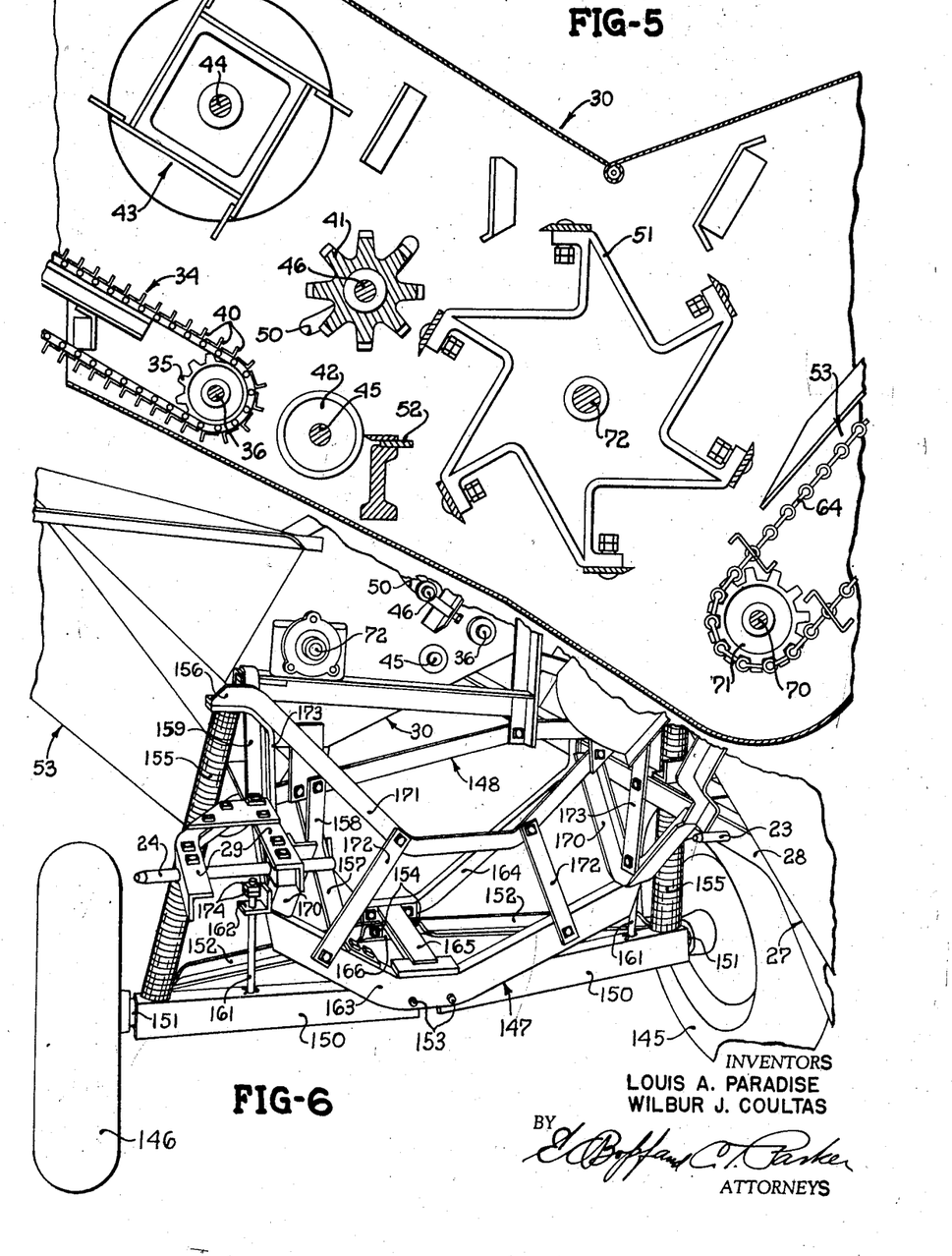
Figure 5 is an enlarged section, taken substantially along the line 5—5 in Figure 1, showing the feeding and cutting mechanism of the ensilage cutting unit.
Figure 6 is an enlarged front view, in perspective, of a portion of the ensilage cutter housing and supporting frame structure, the tractor being removed to show more clearly certain details of the pivotal connections by which the implement is mounted on the tractor, as well as details of the individually sprung auxiliary supporting wheels.

The feed conveyor 34 is positioned in the lower portion of the feed hopper 33 and serves to feed the material downwardly in the hopper to the cutting mechanism 30 which is clearly shown in Figure 5. The feed conveyor 34 comprises a pair of endless chains disposed in spaced parallel relation and trained over upper sprockets (not shown) and lower sprockets 35 (Figure 5) the latter being secured to a transverse shaft 36 suitably journaled in bearings fixedly secured in the front and rear side walls of the feeder housing 33. A plurality of transverse conveyor slats 40, preferably of angle iron, are secured to the endless chains, as shown in Figure 5.

Figure 4:
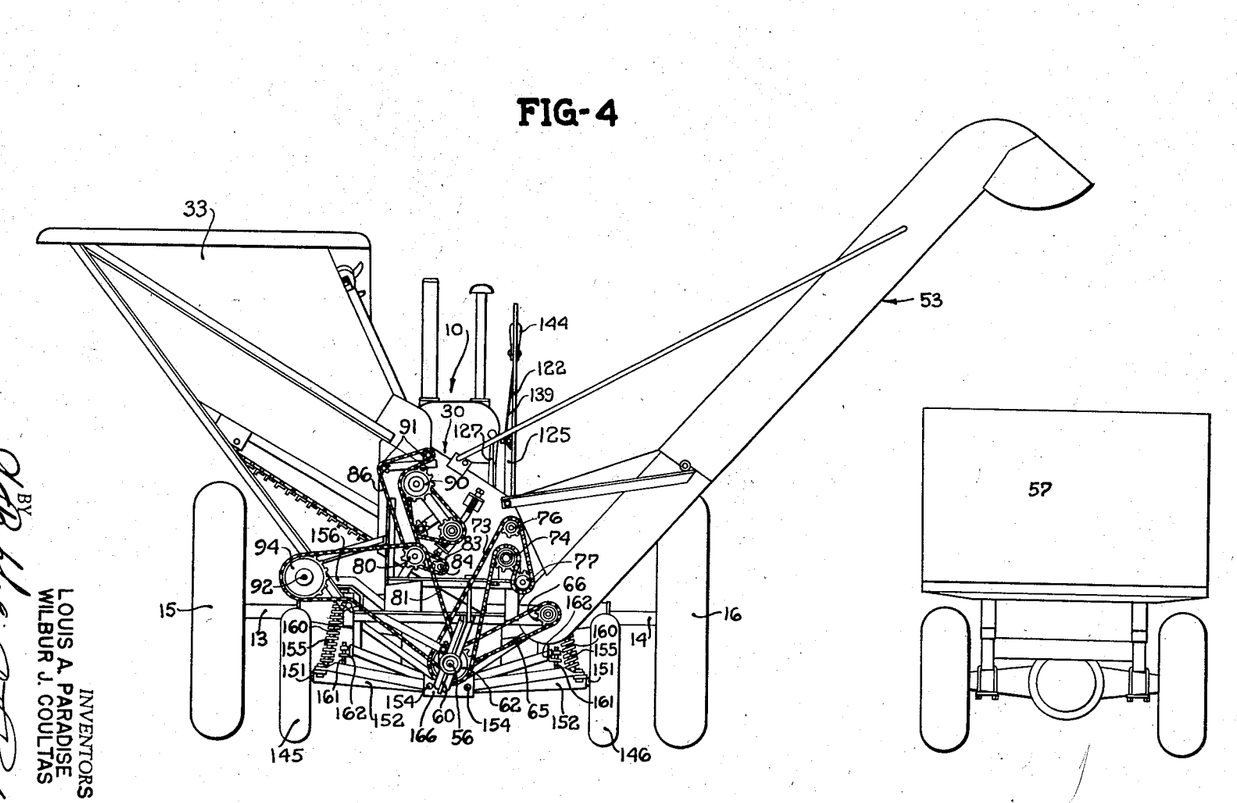
Figure 4 is a rear view of the harvester, showing the elevator in position to discharge ensilage into a wagon.

The ensilage cutting mechanism 30 is similar to that shown and described in Letters Patent No. 2,126,072 granted to Paul H. Westerlund on August 9, 1938, and also in a copending application Serial No. 80,699, filed May 20, 1936, by W. B. Thieman, to which reference may be had for details of the construction and operation thereof. Briefly, the ensilage cutting mechanism 30 includes upper and lower feed rollers 41 and 42, respectively, between which the material delivered by the feed conveyor 34 passes and by which such material is compressed and fed to the cutting mechanism, aided by a beater 43 fixed on a transverse shaft 44 which is journaled on suitable bearings carried by the feeder house side walls. The lower feeding roller 42 is fixedly secured in any suitable manner to a transverse shaft 45, the ends of which project outwardly beyond the side walls of the feeder housing 33. The upper feed roller 41 is fixedly secured in any suitable manner to a transversely extending shaft 46 which is floatingly supported for vertical swinging movement within the limits of arcuate slots 50 formed in the front and rear side walls of the feeder house 33. The opposite ends of the shaft 46 project through such arcuate slots and are rotatably supported therein in a manner described in detail in the aforesaid Westerlund Letters Patent. The feed rollers 41, 42 deliver the material to the cutting mechanism which comprises a rotary knife or cutter 51 operating in conjunction with a stationary knife 52 which is adjustably supported on the frame of the implement adjacent to the rotary cutter 51. This cutting mechanism chops the stalks up into short pieces known in the art as ensilage, and the material drops from the cutting mechanism into the lower end of an upwardly inclined wagon elevator indicated as an entirety by the reference numeral 53, the outer end of said wagon elevator, when in operating position, being disposed to extend over a wagon or truck 57, as illustrated in Figure 4. For details of the construction and operation of the wagon elevator 53, reference may be had to Letters Patent No. 2,111,323, granted to E. T. Johnson on March 15, 1938.

Coming now to the means for driving the operating or moving parts of the harvester, these several parts are driven by power derived from the engine of the propelling tractor 10 through a power take-off shaft 54 which extends rearwardly from the tractor and is operatively connected by means of a universal joint telescopic shaft 55 with a main drive shaft 56. The latter is journaled at its ends in suitable bearings provided in a U-shaped bracket 60 fixedly mounted on the implement frame 22.

Three sprockets, indicated at 61, 62 and 63, are mounted side by side on the drive shaft 56 and are adapted to transmit power, through the agency of suitable driving chains, to drive the gathering chains and feeding mechanism, the rotary cutter 51, and the wagon elevator 53, respectively. The endless conveyor 64 of the wagon elevator 53 is driven by a drive chain 65 trained over sprocket 61 and a second sprocket 66 connected by an overload release clutch 67 to the transverse shaft 70 on which are mounted the lower conveyor rollers 71.

The rotary cutter 51 of the ensilage cutting mechanism 30 is fixedly mounted on a transverse shaft 72 which is journaled in suitable bearings provided in the side walls of the feeder house 33 and projects rearwardly therefrom. The rotary cutter 51 is driven by a chain 73 trained over sprocket 62 and over a second sprocket 74 disposed on the outer end of shaft 72 and connected therewith by an overrunning clutch 75. A pair of idler sprockets 76 and 77 journaled on stub shafts fixedly mounted on the feeder housing 33 serve to train the chain 73 over sprocket 74 in such manner as to secure the desired direction of rotation of the rotary cutter 51, which is counter-clockwise as viewed from the rear of the machine.

Figure 1:
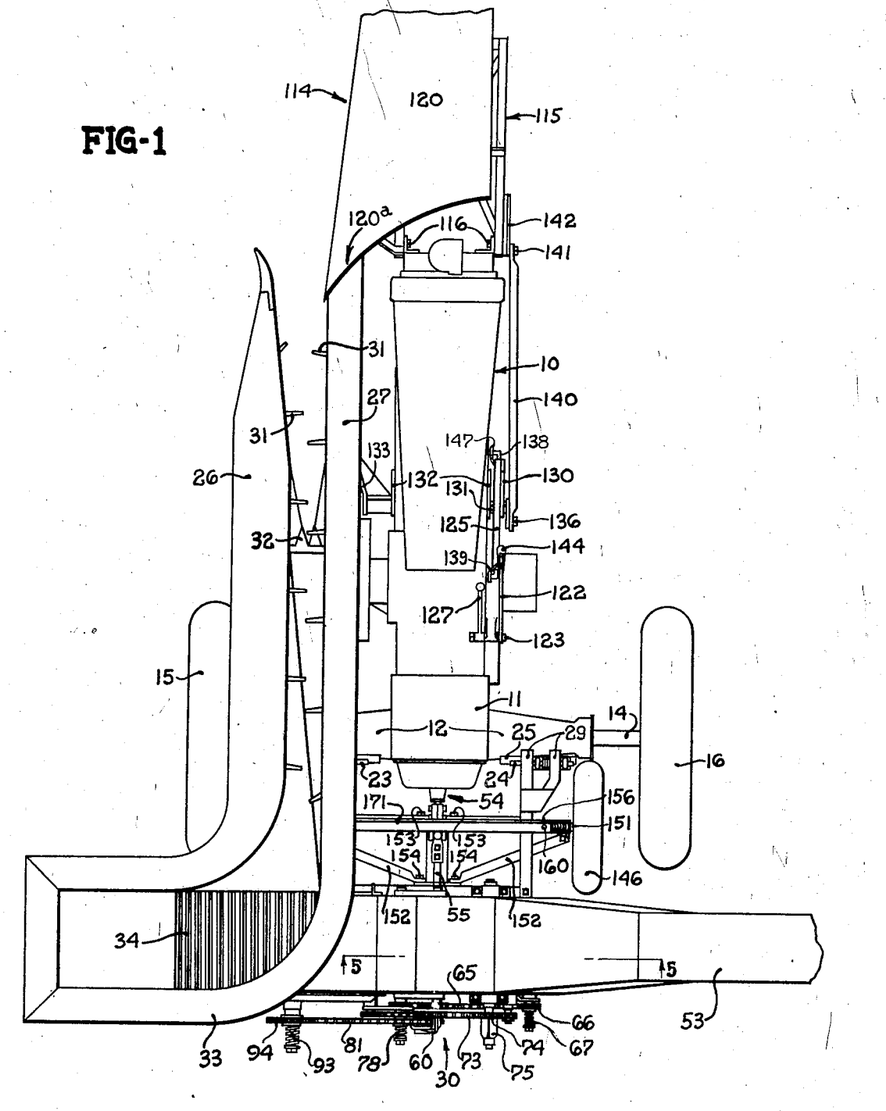
Figure 1 is a top plan view of a tractor mounted ensilage harvester embodying the principles of the present invention.
Figure 2:
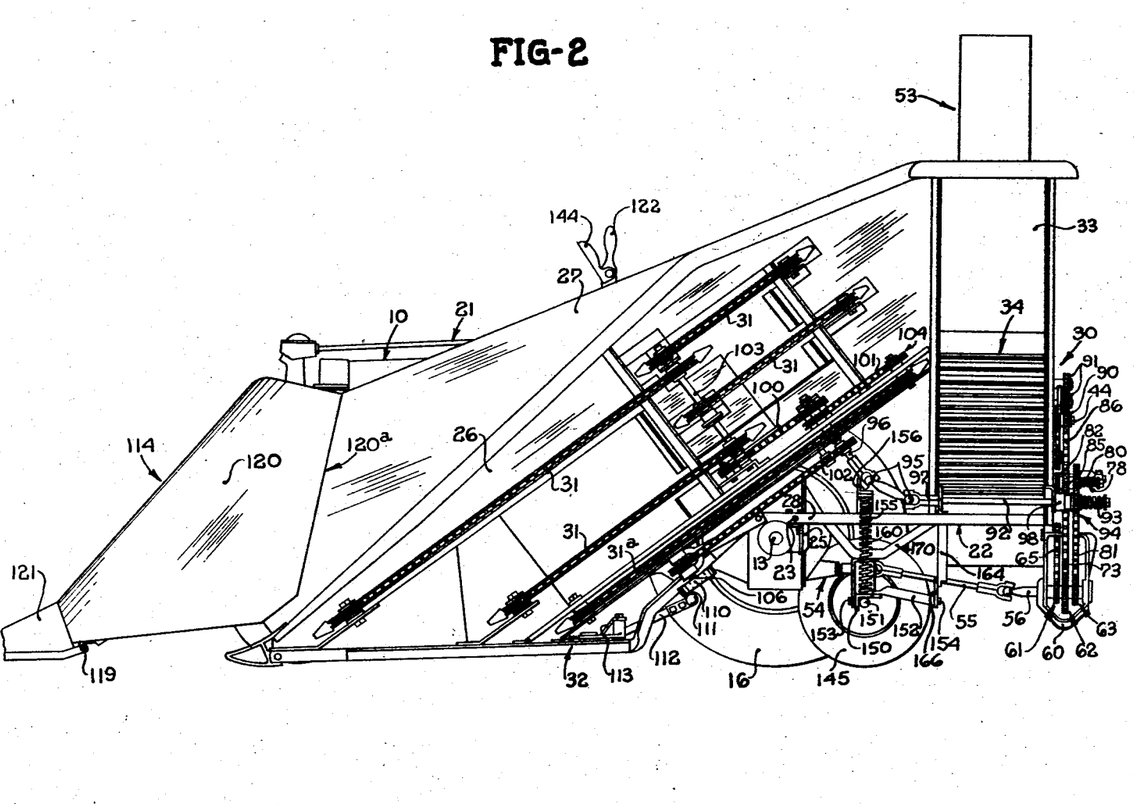
Figure 2 is a side elevation of the harvester as viewed from the left in Figure 1, the tractor driving wheel and auxiliary supporting wheel on the near side being removed to show the details of construction more clearly.

The feed conveyor 34 is driven from sprocket 63, and to this end a sprocket 80 is mounted on the rearwardly projecting end of shaft 36, and connected thereto through an overload release clutch 78, with a chain 81 trained over sprockets 63 and 80. A second sprocket, indicated at 82 (Figure 2) is fixed to shaft 36 on the inner side of the sprocket 80 and over this sprocket is trained a drive chain 83. The drive chain 83 also extends over a driving sprocket 84 suitably secured on the rear end of the shaft 45, by means of which the lower feed roller 42 is driven. A third sprocket 85 (Figure 2) is also mounted on the shaft 36 ahead of sprocket 82, and a driving chain 86 is trained around the sprocket 82 and extends upwardly around one side of a sprocket 90 fixed on the rear end of the shaft 44 to drive the beater 43. A pair of idler sprockets 91 journaled on stub shafts suitably mounted on the rear side wall of the feeder house 33 serve to hold the opposite runs of the chain 86 in the desired spaced relation to drive the beater 43 in a counter-clockwise direction.

Figure 3:
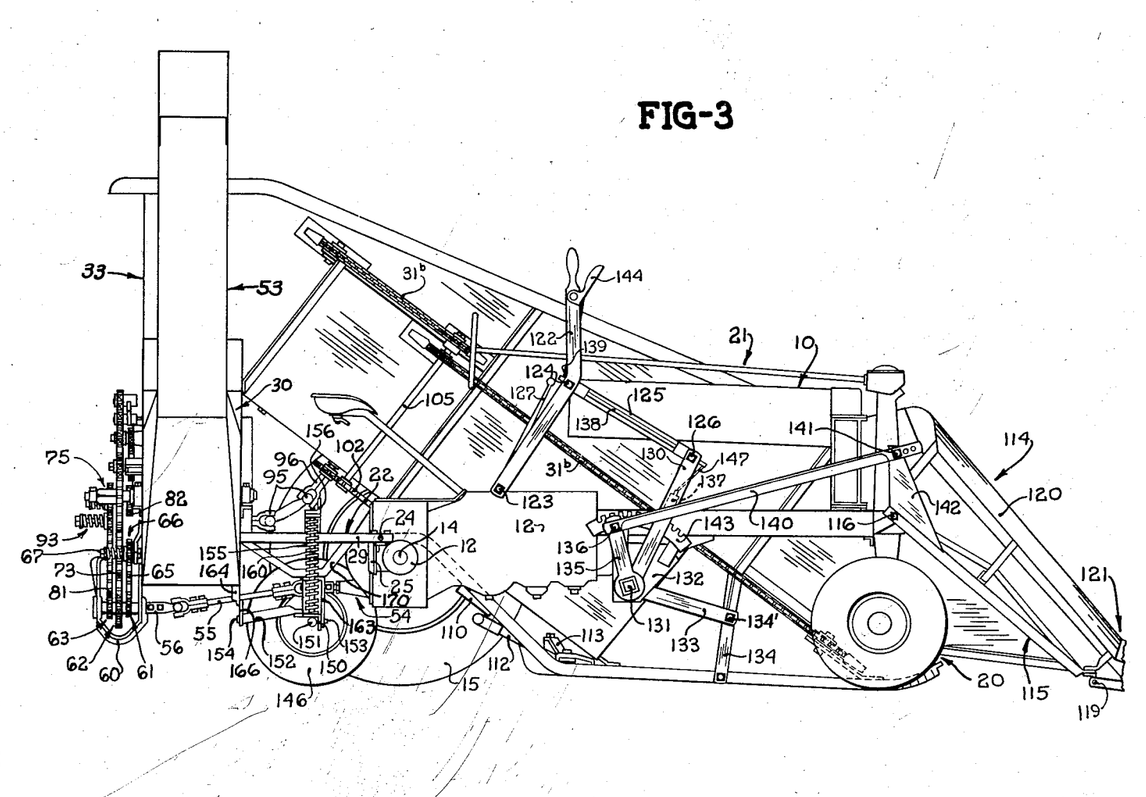
Figure 3 is a side elevation, as viewed from the right in Figure 1, with the near tractor driving wheel and auxiliary supporting wheel removed.

A gathering chain drive shaft 92 is suitably supported in bearings 97, 98 on the frame 22 and extends forwardly under the feeder house 33. This drive shaft 92 is driven through a slip clutch 93 by a sprocket 94 engaging the driving chain 81. The forward end of the drive shaft 92 is connected by a double universal joint 95 to the lower end of an upwardly and forwardly inclined drive shaft 96 journaled on frame 22. The gathering chains 31 are driven by power from the shaft 96 by means of drive chains 100, 101 and 102 (Figure 2) trained over suitable sprockets fixed on the shaft 96. Chain 100 serves to drive a shaft 103 which, in turn, drives a plurality of gathering chains 31, while chain 101 engages a driving member at 104 to drive the lower gathering chain 31a. Driving chain 102 is trained over a sprocket fixed to the lower end of a gathering chain drive shaft 105 journaled on the frame 22 in conjunction with the right hand gathering member 27, and serves to drive a plurality of gathering chains 31b, as shown in Figure 3.

A pitman drive shaft 106 is suitable supported on the frame 22 ahead of the drive shaft 96 and substantially parallel thereto and is provided with a suitable sprocket over which the driving chain 102 is trained to drive the pitman shaft 106. A flywheel 110 is mounted on the lower end of the shaft 106 and is provided with an eccentrically mounted stud 111 to which one end of a pitman 112 is connected. The other end of the pitman 112 is connected to one arm of a bellcrank 113 which is pivoted on the frame 22 for swinging about a vertical axis, the other arm of the bell crank 113 being connected by suitable connecting means to the reciprocating knife 32 which operates to sever the stalks near the ground.

Mounted on the front end of the tractor 10 and adapted to cooperate with the right hand gathering member 27 is a gathering point, indicated as an entirety by the reference numeral 114, comprising a frame 115 which is pivotally mounted at 116 on the front end of the tractor body 11. A curved shield 120 is fixed to the frame 115 and extends forwardly ahead of the dirigible truck 20, terminating in a pointed foot 121 which is pivotally supported at 119 on the frame 115 for limited vertical swinging movement relative thereto and is adapted to float on the surface of the ground to raise fallen stalks of corn and to bring them between the gathering arms 26, 27. One edge of the shield 120 is disposed in sliding contact, as at 120a, with the right hand gathering member 27 and thus provides a substantially unbroken surface over which the stalks pass freely and without catching.

The implement is tiltable about the axis of the shafts 23, 24 to raise and lower the gathering points and reciprocating knife 32 and enable the knife to sever the stalks at varying heights above the ground, and also to raise the front ends of the gathering members 26, 27 and gathering point 114 to transport position clear of the ground. To this end a hand lever 122 is pivoted on the tractor body 11 at 123, which in the embodiment shown is the axis of movement of the tractor clutch lever 127, and is pivotally connected at 124 to the rear end of a link 125. The front end of the link 125 is pivotally connected at 126 to a lever arm 130 fixed on a transverse rock shaft 131 disposed beneath the tractor body 11 and rockably supported thereon in any suitable manner, as by brackets 132. Another lever arm 133 is fixed to the left hand end of the rock shaft 131 and extends forwardly therefrom, being connected at its front end to the frame 22 by a link 134. A third lever arm 135 is likewise fixed to the right hand end of the rock shaft 131 and extends upwardly, the free end of arm 135 being pivotally connected at 136 to a forwardly extending link 140. The front end of the link 140 is adjustably connected by a pivot bolt 141 to a bracket member 142 fixed to the frame 115 of the gathering point 114. Thus, when the hand lever 122 is pulled rearwardly, the rock shaft 131 is rocked in a counter-clockwise direction as viewed in Figure 3 to lift the front end of the harvester through the agency of lifting arm 133 and link 134, and to swing the gathering point 114 upwardly about the axis of the pivot bolts 116 by means of the lifting arm 135 and link 140. The rock shaft 131 is locked in position by latch mechanism 137 disposed on the inner side of arm 130 (Figure 3) which engages a notched sector 143 fixed to the bracket 132. The latch 137 is actuated by a hand grip 144 pivoted on the lever 122 and is operatively connected thereto by linkage comprising a rod 138 journaled in suitable bearings provided on the link 125 and having laterally inwardly bent crank portions at each end thereof, one of said crank portions being connected by a link 139 to the hand grip 144 and the other by a link 147 to the latch 137.

In order to relieve a portion of the weight of the implement from the tractor supporting wheels and at the same time to partially counterbalance the weight of the rearwardly overhanging feeder house 33, ensilage cutter 30 and wagon elevator 53 so that the tilting hand lever 122 may be operated easily, a pair of additional or auxiliary supporting wheels 145, 146 are provided and are disposed to the rear of the axle housing 12 between the tractor wheels 15, 16 and in overlapping relation therewith. The center of gravity of the implement is disposed between the axis of the pivotal support connections 23, 24 and the axis of the wheels 145, 146 so that the auxiliary wheels 145, 146 act to carry a substantial portion of the weight of the implement. By reason of the position of the auxiliary wheels 145, 146 rearward of and adjacent to the axis of the tractor driving wheels 15, 16, the tractor with the implement mounted thereon may be easily steered by means of the dirigible truck 20 and the auxiliary wheels will follow the dirigible truck without excessive lateral strain on the wheels or the implement frame.

Referring now more particularly to Figure 6, each of the wheels 145, 146 is connected to the implement by means of a V-shaped carriage frame, preferably made up of a pair of angle iron members 150 and 152 fixed together at their outer ends and extending laterally inwardly in diverging relation, being connected for vertical swinging movement at their inner ends to a carriage support structure 147 forming part of the implement frame 22. Stub axles 151 are fixed to the outer ends of the members 150, and the auxiliary wheels 145 and 146 are journaled thereon. The carriage support structure 147 includes a pair of longitudinally spaced transversely disposed V-shaped members 163 and 164 connected together at their apexes by a fore and aft extending member 165. The rear member 164 is fixedly secured at its upper ends to the inner sides of the members 28, 29 and is provided at its apex with a plate 166 to which the axle support members 152 are pivotally connected at their inner ends by pivot bolts 154. The inner ends of the axle support members 150 are pivotally connected to the frame member 163 by pins 153 which are disposed coaxial with the pivot bolts 154. Longitudinally disposed V-shaped members 170 are fixed to the outer ends of the member 163 and are securely fastened to the inner sides of the members 28, 29, respectively, and the carriage support structure 147 is rigidly secured to a feeder house support frame 148 forming a part of the implement frame 22 by means of braces 157, 158 and 159.

The weight of the implement is transmitted to the auxiliary supporting wheels 145, 146 by means of two vertically disposed helical compression springs 155, each of which is connected at its lower end to the outer end of its respective axle supporting member 150, and at its upper end to the laterally outwardly extending portion 156 of a U-shaped frame member 171. The frame member 171 is arranged above the member 163 in generally parallel relation thereto and is connected to the latter member by braces 172 and vertical bars 173. Each of the springs 155 embraces a guide rod 160 which is pivotally connected at its lower end to the supporting member 150 and slidably engages a suitable aperture provided in the end portion 156 of the frame member 171, serving to prevent the spring 155 from buckling. Limit stop bolts 161 are connected to each of the supporting members 150 and slidably engage suitable apertures in angle brackets 162 fixed to the frame members 170. Nuts 174 screwed onto the threaded end of each bolt 161 engage the bracket 162 and limit the downward swinging of the auxiliary wheel supporting structure.

To dismount the harvester attachment from the tractor, the universal joint telescopic shaft 55 is disconnected from the power take-off shaft and the two connecting shafts 23, 24 are removed endwise from the frame members 28, 29, respectively, and from the bracket members 25. The link 134 is disconnected from the arm 133 by removing the connecting bolt 134', and the front end of the gathering members 26, 27 is then raised, tilting the harvester attachment back on the auxiliary wheels 145, 146 sufficiently to clear the rear axle housing of the tractor and allow the latter to be driven forwardly out of engagement with the harvester frame. If it is desired to dismount the gathering point 114 and depth gauging linkage, the bracket 132 is removed; the connecting bolt 123 disconnected from the tractor frame; and the bolts 116 are removed, after which the tractor may be backed out of engagement with the gathering point frame 115. By reason of the close proximity of the center of gravity of the harvester attachment to the axis of the wheels 145, 146, and the mechanical advantage gained by the leverage afforded by the gathering members 26, 27, it is possible for one man to move the attachment around on the wheels 145, 146 with ease, using the ends of the gathering members 26, 27 as handles in the manner of a wheel barrow. One of the principal advantages of positioning the auxiliary wheels 145, 146 behind the rear axle of the tractor is that the tractor may be backed into the frame and connected thereto without driving either the dirigible truck 20 or the traction wheels 15, 16 over any part of the harvester frame, and without necessitating the assembly of the implement structure, piece by piece, on the tractor body.

Under certain field conditions where the growth of corn is not unduly rank, the gathering point 114 may be omitted and in its place the right hand gathering member 27 may be extended forwardly ahead of the dirigible truck 20 with a pointed foot similar to 121 pivoted to the front end thereof to follow the contour of the ground and pick up any fallen stalks. With this arrangement, the frame 115 and all mounting connections, as well as the lever arm 134 and lifting link 140 are eliminated and the entire implement may be mounted on or dismounted from the tractor as a unit.

What we claim as our invention is:

1. The combination with a tractor having a body including a rear axle housing, axle means journaled in said housing, and traction wheels carried on said axle means, of an ensilage harvesting attachment comprising a frame, means for mounting said frame on said tractor so as to move bodily therewith, a pair of forwardly extending gathering arms disposed on said frame at one side of said tractor and ahead of said rear axle housing, stalk cutting mechanism disposed on said frame between said gathering arms adjacent the ground, ensilage cutting mechanism mounted on said frame to the rear of said axle housing, and means for raising the cut stalks over said axle housing and delivering the same to said ensilage cutting mechanism.

2. The combination with a tractor having a body including a rear axle housing, axle means journaled in said housing, and traction wheels carried on said axle means, of an ensilage harvesting attachment comprising a frame, means for mounting said frame on said tractor so as to move bodily therewith, a pair of forwardly extending gathering arms disposed on said frame at one side of said tractor and ahead of said rear axle housing, stalk cutting mechanism disposed on said frame between said gathering arms adjacent the ground, transversely arranged ensilage cutting mechanism disposed to the rear of said axle housing, and means for raising the cut stalks over said axle housing and feeding the same laterally into said ensilage cutting mechanism.

3. The combination with a tractor having a body including a rear axle housing, axle means journaled in said housing, and traction wheels carried on said axle means, of an ensilage harvesting attachment comprising a frame, means for mounting said frame on said tractor so as to move bodily therewith, a pair of forwardly extending gathering arms disposed on said frame at one side of said tractor and ahead of said rear axle housing, stalk cutting mechanism disposed on said frame between said gathering arms adjacent the ground, transversely arranged ensilage cutting mechanism disposed to the rear of said axle housing, gathering chains cooperating with said gathering arms to raise the cut stalks over said axle housing, and a laterally inclined feeder housing for receiving the stalks from said gathering chains and delivering the same laterally into said ensilage cutting mechanism.

4. The combination with a tractor having a body supported on fore and aft carrying wheels, of a harvester attachment comprising a frame pivotally supported on said tractor body, operating mechanism carried on said frame including a pair of forwardly extending gathering arms disposed alongside said tractor body, a gathering point adapted to cooperate with said gathering arms and comprising a frame pivotally supported on said tractor body, and means for adjusting the positions of harvester frame and said gathering point frame on the tractor including a rock shaft rotatably supported on the tractor body, link means operatively connecting said harvester frame and said gathering point frame with said rock shaft whereby the weight of one of said frames counterbalances a portion of the weight of the other of said frames, and means for rocking said rock shaft.

5. The combination with a tractor having a body including a rear axle housing, of an implement attachment comprising a frame, means for mounting said frame on said tractor body to move coadunatively therewith, operating mechanism carried on said frame and disposed partially ahead of and partially behind said rear axle housing, and auxiliary supporting wheel means operatively connected to said implement attachment to carry a portion of the weight thereof and disposed behind said rear axle housing whereby said implement attachment may be tilted back on said auxiliary wheels to raise the forwardly mounted portion thereof clear of said rear axle housing and allow the tractor to be driven into and out of engagement with said frame.

6. The combination, with a tractor having a body supported at one end on driving wheel means and at the other end on dirigible wheel means, of an implement comprising a frame, means for mounting said frame on the tractor body in a fixed position relative thereto, wheel means separate from said tractor and spaced longitudinally of said driving wheel means opposite said dirigible wheel means, means connecting said wheel means with said frame permitting vertical movement relative thereto, and means acting upon said connecting means for applying a yielding upthrust against said frame.

7. In combination, a generally longitudinal supporting frame carried at the rear end on a pair of laterally spaced traction wheels and at the front end on at least one dirigible wheel, an attachment frame mounted on said supporting frame in normally fixed relation thereto, an additional supporting wheel disposed on an axis of rotation substantially parallel to but spaced rearwardly from the axis of said traction wheels, means connecting said additional wheel to one of said frames for vertical movement relative thereto, and means acting downwardly upon said additional wheel and upwardly against one of said frames for determining the weight carried on said wheel.

8. The combination, with a tractor having a body supported at one end on driving wheel means and at the other end on dirigible wheel means, of an implement comprising a frame, means for mounting said frame on the tractor body providing for movement relative thereto, means for locking said frame in one of several fixed positions relative to the tractor so as to move bodily therewith, an additional supporting wheel spaced longitudinally from the axis of said driving wheel means opposite said dirigible wheel means, means connecting said additional supporting wheel with said frame for vertical movement relative thereto, and spring means acting downwardly upon said additional wheel and reacting upwardly against said frame for loading a portion of the weight thereof upon said additional wheel.

9. In combination, a supporting frame supported on laterally spaced traction wheels and at least one dirigible wheel spaced forwardly thereof, an attachment frame supported on said supporting frame and movable coadunatively therewith, a pair of auxiliary supporting wheels disposed between said rear traction wheels and to the rear of the axis of rotation thereof, means for connecting each of said wheels to one of said frames for independent vertical movement relative thereto, and spring means acting downwardly upon each of said auxiliary wheels and reacting upwardly against one of said frames.

10. In combination with a tractor having a transversely extending rear axle, a pair of traction wheels carried on opposite ends of said axle for supporting said tractor, and forwardly disposed dirigible supporting wheels, an implement frame supported on said tractor in normally fixed relation thereto, a pair of auxiliary supporting wheels disposed between said traction wheels to the rear of said rear axle, means connecting each of said auxiliary wheels to said implement frame for vertical swinging movement relative thereto, and spring means for loading a portion of the weight of said implement frame on each of said auxiliary wheels.

11. In combination with a tractor supported on laterally spaced rear traction wheels and at least one forwardly disposed dirigible wheel, an implement frame mounted on said tractor and normally rigid with respect thereto, a pair of laterally spaced auxiliary supporting wheels disposed to the rear of the axis of said traction wheels, a supporting arm extending laterally from each of said auxiliary wheels and pivotally connected to said implement frame for swinging about a longitudinal axis permitting independent vertical movement of each of said wheels relative to said frame, and spring means acting downwardly upon each of said auxiliary wheels and reacting upwardly upon said implement frame for loading a portion of the weight of the latter upon said wheels.

12. In combination, a generally longitudinal supporting frame carried at the rear end on a pair of laterally spaced traction wheels and at the front end on at least one dirigible wheel, an attachment frame mounted on said supporting frame in normally fixed relation thereto, an additional supporting wheel, a supporting member extending laterally from said additional wheel and pivotally connected to one of said frames for swinging about a longitudinal axis, and means acting downwardly upon said supporting member and reacting upwardly against one of said frames for loading a portion of the weight thereof upon said additional wheel.

13. The combination, with a tractor having a body supported at one end on driving wheel means and at the other end on dirigible wheel means, of an implement comprising a frame, means for mounting said frame on the tractor body in a fixed position relative thereto, an auxiliary wheel for carrying a portion of the weight of said implement frame, a supporting member extending laterally from said auxiliary wheel and pivotally connected to said implement for swinging about a substantially longitudinal axis, and spring means acting downwardly upon said supporting member and reacting upwardly against said implement frame for loading a portion of the weight of the latter upon said wheel.

14. The combination, with a tractor having a body supported at one end on driving wheel means and at the other end on dirigible wheel means, of an implement comprising a frame, means for mounting said frame on the tractor body in a fixed position relative thereto, an auxiliary wheel for carrying a portion of the weight of said implement frame, a supporting member extending laterally from said auxiliary wheel and pivotally connected to said implement for swinging about a substantially longitudinal axis, means restraining said auxiliary wheel from moving longitudinally relative to said implement frame, and a vertically disposed compression spring thrusting downwardly against said supporting member and upwardly against said implement frame.

15. In combination with a tractor supported on laterally spaced rear traction wheels and at least one forwardly disposed dirigible wheel, an implement frame mounted on said tractor and normally rigid with respect thereto, a pair of laterally spaced auxiliary supporting wheels, a pair of generally transversely disposed wheel supporting structures, each of said supporting structures being connected to said frame by two longitudinally spaced coaxial pivots and extending laterally therefrom, one of said wheels being journaled on the free end of each of said supporting structures, and spring means acting downwardly on each of said wheel supporting structures and reacting upwardly on said implement frame.

16. In combination with a tractor having a transversely extending rear axle, a pair of traction wheels carried on opposite ends of said axle for supporting said tractor, and forwardly disposed dirigible supporting wheels, a corn harvesting implement comprising a frame pivotally supported on said tractor, means for adjustably fixing said frame to the tractor so as to move coadunatively therewith, a pair of forwardly extending gathering arms disposed along one side of said tractor and ahead of said rear axle, stalk cutting mechanism disposed between said gathering arms adjacent the ground, transversely arranged ensilage cutting mechanism disposed to the rear of said axle, means for raising the cut stalks over said axle and feeding the same laterally into said ensilage cutting mechanism, an additional supporting wheel disposed to the rear of said axle, the center of gravity of said implement being disposed between the axis of said additional wheel and the point of pivotal connection of said frame with said tractor, means connecting said additional supporting wheel with said frame for vertical movement relative thereto, and spring means acting between said additional wheel and said frame for applying a yielding upthrust against said frame to counterbalance a portion of the weight thereof.

17. In combination with a tractor having a transversely extending rear axle, a pair of traction wheels carried on opposite ends of said axle for supporting said tractor, and forwardly disposed dirigible supporting wheels, a corn harvesting implement comprising a frame pivotally supported on said tractor, means for adjustably fixing said frame to the tractor so as to move coadunatively therewith, a pair of forwardly extending gathering arms disposed along one side of said tractor and ahead of said rear axle, stalk cutting mechanism disposed between said gathering arms adjacent the ground, transversely arranged ensilage cutting mechanism disposed to the rear of said axle, means for elevating the stalks rearwardly over said axle, means for feeding said stalks laterally into said ensilage cutting mechanism, a pair of auxiliary supporting wheels disposed between said traction wheels, a supporting arm extending laterally from each of said auxiliary wheels and pivotally connected to said implement frame for swinging about a longitudinal axis permitting independent vertical movement of each of said wheels relative to said frame, and spring means acting downwardly upon each of said auxiliary wheels and reacting upwardly upon said implement frame for loading a portion of the weight of the latter upon said wheels.

18. In combination with a tractor, an implement frame mounted thereon by means providing for tilting adjustment about a transverse pivot axis, a second attachment frame mounted on said tractor for swinging movement about another axis, a rock shaft journaled on said tractor, link means connecting each of said frames to said rock shaft, the pivot axes of said frames being so located that the weight of one of said frames counterbalances a portion of the weight of the other of said frames, and means for rocking said rock shaft.

19. In combination with a tractor having a body including a laterally extending rear axle housing, a traction wheel journaled thereon, and a dirigible wheel supporting the front end of said body, an implement attachment comprising a frame, means pivotally supporting said frame on said axle housing for movement about a transverse axis and unbalanced relative thereto thereby tending to swing in one direction, a second attachment frame pivotally supported on said tractor near the forward end thereof and tending to swing by its own weight in the opposite direction, a rock shaft disposed transversely under said tractor body, and link means connecting each of said frames with said rock shaft and counterbalancing one frame against the other.

LOUIS A. PARADISE.
WILBUR J. COULTAS.